United States Patent
Mullins et al.

(10) Patent No.: US 10,726,074 B2
(45) Date of Patent: Jul. 28, 2020

(54) IDENTIFYING AMONG RECENT REVISIONS TO DOCUMENTS THOSE THAT ARE RELEVANT TO A SEARCH QUERY

(71) Applicant: Microsoft Technology Licensing, LLC, Redmond, WA (US)

(72) Inventors: Christopher Lee Mullins, Sammamish, WA (US); Robert Earl Standefer, III, Duvall, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 77 days.

(21) Appl. No.: 15/398,555

(22) Filed: Jan. 4, 2017

(65) Prior Publication Data
US 2018/0189277 A1    Jul. 5, 2018

(51) Int. Cl.
*G06F 16/93*    (2019.01)
*G06F 16/22*    (2019.01)

(52) U.S. Cl.
CPC .......... *G06F 16/93* (2019.01); *G06F 16/2228* (2019.01)

(58) Field of Classification Search
CPC ......... G06F 17/30011; G06F 17/30321; G06F 16/93; G06F 16/2228
See application file for complete search history.

(56) References Cited

U.S. PATENT DOCUMENTS

| | | | |
|---|---|---|---|
| 6,324,551 B1 | 11/2001 | Lamping et al. | |
| 6,356,922 B1 | 3/2002 | Schilit et al. | |
| 6,397,213 B1 | 5/2002 | Cullen et al. | |
| 6,421,691 B1 | 7/2002 | Kajitani | |
| 6,484,162 B1 | 11/2002 | Edlund et al. | |
| 6,928,425 B2 | 8/2005 | Grefenstette et al. | |
| 7,334,195 B2 | 2/2008 | Gemmell et al. | |
| 7,395,501 B2 | 7/2008 | Graham et al. | |
| 7,437,330 B1 | 10/2008 | Robinson et al. | |
| 7,627,582 B1 | 12/2009 | Ershov | |
| 7,627,590 B2 | 12/2009 | Boguraev et al. | |
| 7,689,624 B2 | 3/2010 | Huang et al. | |
| 7,752,204 B2 | 7/2010 | Kao et al. | |
| 7,756,857 B2 | 7/2010 | Wan | |
| 7,849,090 B2 | 12/2010 | Sweeney | |
| 7,865,494 B2 | 1/2011 | Best et al. | |
| 8,005,825 B1 | 8/2011 | Ghosh | |
| 8,005,835 B2 | 8/2011 | Walther et al. | |

(Continued)

FOREIGN PATENT DOCUMENTS

EP    210748    10/2009

OTHER PUBLICATIONS

GitHub.com webpages from archive.org, various publication dates ranging Apr. 20, 2013 to Nov. 16, 2016. (Year: 2016).*

(Continued)

*Primary Examiner* — Jay A Morrison
(74) *Attorney, Agent, or Firm* — Michael Best & Friedrich LLP

(57) ABSTRACT

A facility for reporting on a corpus of documents is described. The facility receives a user-specified search query. In response to the receiving, among documents in the corpus, the facility identifies a proper subset that have each (1) been modified in a manner relevant to the search query (2) at a recent time. For each of at least a portion of the identified documents, the facility causes to be presented information describing the document.

13 Claims, 8 Drawing Sheets

(56) References Cited

U.S. PATENT DOCUMENTS

| | | | |
|---|---|---|---|
| 8,090,708 B1 | 1/2012 | Held et al. | |
| 8,099,406 B2 | 1/2012 | Lee | |
| 8,170,932 B1 | 5/2012 | Krakowiecki et al. | |
| 8,515,816 B2 | 8/2013 | King et al. | |
| 8,538,967 B1 | 9/2013 | Wu et al. | |
| 8,554,800 B2 | 10/2013 | Goldentouch | |
| 8,577,911 B1 | 11/2013 | Stepinski et al. | |
| 8,819,856 B1* | 8/2014 | Tiffe | G06F 21/125 726/31 |
| 8,965,983 B2 | 2/2015 | Costenaro et al. | |
| 9,043,319 B1 | 5/2015 | Burns et al. | |
| 9,043,695 B2 | 5/2015 | Saito | |
| 9,092,773 B2 | 7/2015 | Daly et al. | |
| 9,430,454 B2 | 8/2016 | Newman et al. | |
| 9,588,941 B2 | 3/2017 | Carrier et al. | |
| 9,626,455 B2 | 4/2017 | Miller et al. | |
| 2001/0044795 A1* | 11/2001 | Cohen | G06F 17/30699 |
| 2003/0037034 A1* | 2/2003 | Daniels | G06Q 10/087 |
| 2004/0013302 A1 | 1/2004 | Ma et al. | |
| 2004/0015483 A1 | 1/2004 | Hogan | |
| 2004/0024739 A1 | 2/2004 | Copperman et al. | |
| 2004/0194021 A1 | 9/2004 | Marshall et al. | |
| 2004/0205046 A1* | 10/2004 | Cohen | G06F 16/316 |
| 2004/0261016 A1 | 12/2004 | Glass et al. | |
| 2005/0055357 A1* | 3/2005 | Campbell | G06F 8/61 |
| 2007/0003166 A1 | 1/2007 | Berkner | |
| 2007/0055831 A1* | 3/2007 | Beeston | G06F 3/0611 711/154 |
| 2007/0294614 A1 | 12/2007 | Jacquin et al. | |
| 2008/0154886 A1 | 6/2008 | Podowski et al. | |
| 2008/0184101 A1 | 7/2008 | Joshi et al. | |
| 2008/0201632 A1 | 8/2008 | Hong et al. | |
| 2008/0263023 A1 | 10/2008 | Vailaya et al. | |
| 2008/0270396 A1* | 10/2008 | Herscovici | G06F 16/313 |
| 2008/0288859 A1 | 11/2008 | Yuan et al. | |
| 2009/0157572 A1 | 6/2009 | Chidlovskii | |
| 2009/0222490 A1* | 9/2009 | Kemp | G06F 16/93 |
| 2011/0082848 A1 | 4/2011 | Goldentouch | |
| 2011/0131211 A1 | 6/2011 | Harrington | |
| 2011/0295844 A1* | 12/2011 | Sun | G06Q 10/00 707/723 |
| 2012/0254161 A1 | 10/2012 | Zhang et al. | |
| 2012/0310931 A1 | 12/2012 | Oliver et al. | |
| 2013/0124515 A1 | 5/2013 | Ghimire | |
| 2013/0254126 A1 | 9/2013 | Koenig et al. | |
| 2014/0040812 A1* | 2/2014 | Kurtz | G06F 17/30126 715/781 |
| 2014/0101527 A1 | 4/2014 | Suciu | |
| 2014/0229475 A1 | 8/2014 | Walsh | |
| 2014/0250377 A1 | 9/2014 | Bisca et al. | |
| 2015/0169755 A1 | 6/2015 | Cierniak et al. | |
| 2015/0302063 A1 | 10/2015 | Nigam et al. | |
| 2015/0331841 A1 | 11/2015 | Antebi et al. | |
| 2015/0339282 A1 | 11/2015 | Goyal | |
| 2016/0034567 A1 | 2/2016 | Miller et al. | |
| 2016/0070741 A1* | 3/2016 | Lin | G06F 17/30174 707/624 |
| 2016/0246886 A1* | 8/2016 | Chakraborty | G06F 16/958 |
| 2016/0372079 A1 | 12/2016 | Ku | |
| 2017/0011073 A1* | 1/2017 | Deshpande | G06F 16/215 |
| 2017/0075862 A1 | 3/2017 | Kumar | |
| 2017/0193039 A1* | 7/2017 | Agrawal | G06F 17/30424 |
| 2017/0220546 A1 | 8/2017 | Codrington et al. | |
| 2017/0251072 A1 | 8/2017 | Rinehart et al. | |
| 2017/0300481 A1 | 10/2017 | Mullins et al. | |
| 2017/0351954 A1* | 12/2017 | Kosarek | G06Q 50/01 |
| 2018/0025303 A1 | 1/2018 | Janz | |
| 2018/0165554 A1 | 6/2018 | Zhang et al. | |

OTHER PUBLICATIONS

Elsas et al., "Leveraging temporal dynamics of document content in relevance ranking," Proceedings of the third ACM international conference on Web search and data mining, ACM, 2010. (Year: 2010).*

"Unindexed items in Content Search," https://support.office.com/en-us/article/Unindexed-items-in-Content-Search-d1691de4-ca0d-446f-a0d0-373a4fc8487b?ui=en-US&rs=en-, Retrieved on: Oct. 5, 2016, 5 pages.

"International Search Report and Written opinion Issued in PCT Application No. PCT/US2017/027388", dated Jul. 12, 2017, 13 Pages.

Xu, et al., "GooRaph: Document Visualization of Search Results", Retrieved from http://www.leeds.ac.uk/evie/workpackages/wp5/EDV_09_WP5_PR01_v2.1_DocVizOfSearchResults.pdf, Dec. 24, 2014, 8 Pages.

"Non Final Office Action Issued in U.S. Appl. No. 15/098,240", dated Jan. 2, 2019, 19 Pages.

"Final Office Action Issued in U.S. Appl. No. 15/098,240", dated May 22, 2019, 15 Pages.

"Final Office Action Issued in U.S. Appl. No. 15/098,240", dated Mar. 11, 2020, 14 Pages.

"Non Final Office Action Issued in U.S. Appl. No. 15/098,240", dated Nov. 8, 2019, 16 Pages.

* cited by examiner

IDENTIFYING AMONG RECENT REVISIONS TO DOCUMENTS THOSE THAT ARE RELEVANT TO A SEARCH QUERY

BACKGROUND

Electronic documents can contain content such as text, spreadsheets, slides, diagrams, charts, and images. Electronic documents can be the subject of a variety of activities, performed by a variety of people. These can include, for example: authoring a document, modifying/revising/editing a document, etc.

Some conventional search engines allow users to input a search query made up of one or more words, and use a document search index to return a list of documents in a group of documents (a "corpus") that are relevant to the search query, such as documents in which all of the words in the search query occur; in which all of the words in the search query occur in close proximity to one another; in which all of the words in the search query occur in the same order as in the search query; etc.

SUMMARY

This summary is provided to introduce a selection of concepts in a simplified form that are further described below in the Detailed Description. This summary is not intended to identify key factors or essential features of the claimed subject matter, nor is it intended to be used to limit the scope of the claimed subject matter.

A facility for reporting on a corpus of documents is described. The facility receives a user-specified search query. In response to the receiving, among documents in the corpus, the facility identifies a proper subset that have each (1) been modified in a manner relevant to the search query (2) at a recent time. For each of at least a portion of the identified documents, the facility causes to be presented information describing the document.

DETAILED DESCRIPTION

Figure 1:
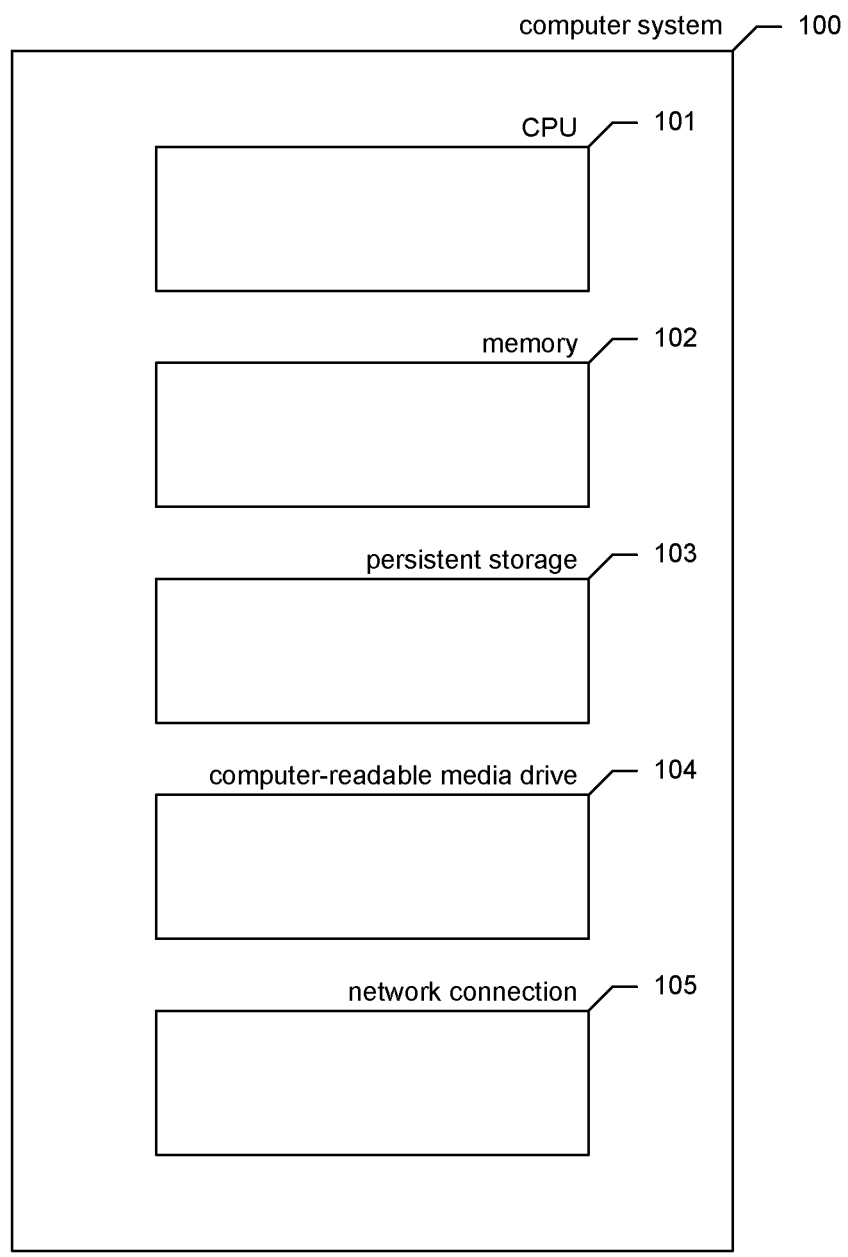
FIG. 1 is a block diagram showing some of the components typically incorporated in at least some of the computer systems and other devices on which the facility operates.

The inventors have recognized several disadvantages endemic to conventional approaches to document search. First, in many cases, no documents can be found that are relevant to a search query as the only documents relevant to the search query were authored too recently to be included in a document search index. Also, documents that are found are often (1) only tangentially related to the search query, and/or (2) stale, in the sense of having been written significantly earlier and not containing information of current value.

In response to this recognition, the inventors have conceived and reduced to practice a software and/or hardware facility ("the facility") for identifying among recent revisions to documents those that are relevant to a search query.

The facility maintains, across a corpus of documents, a revision index on the terms that are involved in revisions to the documents that also reflects the times at which revisions are made. In some embodiments, the facility maintains such a revision index at a low level of latency, such as taking only 0.01 second, 0.1 second, one second, 10 seconds, a minute, five minutes, etc. to add a revision to the revision index after the revision is performed. In some embodiments, the facility updates revision index synchronously with each revision, such that the revision is not shown to the person making it to be completed until the revision index is updated to reflect it. This approach to maintaining the revision index is sometimes described as "transactional."

The facility receives a search query from user made up of one or more terms. The facility uses the index to identify recent revisions to documents that are relevant to the search query, and displays information about these recent relevant revisions. In various embodiments, the facility uses various weightings of relevance versus recency in selecting revisions to include in the revision search result and ordering or otherwise ranking these selected revisions. As one example, when the facility receives a "manganese cathodes" search query from user, it may identify revisions to two documents in the preceding half-hour as relevant to this search query, and display information about them, such as the name of the document, a link to the document, the author of the document, the time of the revision, a video replay of the revision, a live view of ongoing revisions to the document, etc.

In some embodiments, the facility performs this revision search in parallel with conventional document search, and presents the results from each in distinct sections of a user interface display. To extend the example of the "manganese cathodes" search query, the facility may also perform a conventional document search using the search query that identifies two other documents that have had content relevant to the search query for longer periods of time. In this case, the facility displays information about these two other documents at the same time as the two recent relevant revisions In some embodiments, after presenting a revision search result for a search query, the facility monitors for new document revisions that are relevant to the search query. In some embodiments, the facility immediately adds these to the displayed revision search result as they occur. In some embodiments, the facility displays a visual indication that new document revisions relevant to the search query have been performed; the user can interact with this visual indication, such as by selecting it, in order to display the new relevant document revisions. To extend the example of the "manganese cathodes" search query, 90 seconds after the facility displays information about the two recent relevant revisions, it may determine that a new document revision has been performed that is relevant to the search query; in response, it displays information about this new document revision together with information about the original two recent relevant document revisions.

In some embodiments, the facility includes with information about each recent or new relevant document revision one or more controls for interacting with the author responsible for each of these revisions, such as controls for sending the author an asynchronous message—such as an email message, a text message, an instant message, a voice message, a meeting scheduling request, etc.—or interacting with the author in real time—such as in a voice call, a video call, a text chat session, a collaborative editing session focused on the document, etc.

In some embodiments, the facility uses a time-segmented revision index, in which the revision index is divided into segments each representing the revisions that occurred in a distinct period of time. For example, a first index segment may represent all of the revisions that occurred between 09:05:11 and 09:05:12, a second index segment may result represent all of the revisions that occurred between 09:05:12 and 09:05:13, etc. In some such embodiments, the facility traverses the index segments beginning with the latest in the direction of the earliest, and terminates the traversal once an adequate number of recent relevant revisions have been identified.

In some embodiments, the facility identifies document revisions relevant to each query without regard for when the revision was made.

In some embodiments, in identifying relevant document revisions relevant to a query, the facility considers revisions of particular relevance to the user issuing the query, such as by identifying revisions based on how close the user performing each revision is to the querying user in a social graph or an organizational graph.

By performing in some or all of these ways, the facility makes it easy for a user to learn about and engage with current work that is relevant to the user's search query, and therefore the user's present interests or needs.

Also, by performing in some or all of the ways described above and storing, organizing, and accessing information relating to document revisions in an efficient way, the facility meaningfully reduces the hardware resources needed to store and exploit this information, including, for example: reducing the amount of storage space needed to store the information relating to document revisions; and reducing the number of processing cycles needed to store, retrieve, or process the information relating to document revisions. This allows programs making use of the facility to execute on computer systems that have less storage and processing capacity, occupy less physical space, consume less energy, produce less heat, and are less expensive to acquire and operate. Also, such a computer system can respond to user requests pertaining to information relating to document revisions with less latency, producing a better user experience and allowing users to do a particular amount of work in less time.

FIG. 1 is a block diagram showing some of the components typically incorporated in at least some of the computer systems and other devices on which the facility operates. In various embodiments, these computer systems and other devices 100 can include server computer systems, desktop computer systems, laptop computer systems, netbooks, mobile phones, personal digital assistants, televisions, cameras, automobile computers, electronic media players, etc. In various embodiments, the computer systems and devices include zero or more of each of the following: a central processing unit ("CPU") 101 for executing computer programs; a computer memory 102 for storing programs and data while they are being used, including the facility and associated data, an operating system including a kernel, and device drivers; a persistent storage device 103, such as a hard drive or flash drive for persistently storing programs and data; a computer-readable media drive 104, such as a floppy, CD-ROM, or DVD drive, for reading programs and data stored on a computer-readable medium; and a network connection 105 for connecting the computer system to other computer systems to send and/or receive data, such as via the Internet or another network and its networking hardware, such as switches, routers, repeaters, electrical cables and optical fibers, light emitters and receivers, radio transmitters and receivers, and the like. While computer systems configured as described above are typically used to support the operation of the facility, those skilled in the art will appreciate that the facility may be implemented using devices of various types and configurations, and having various components.

Figure 2:
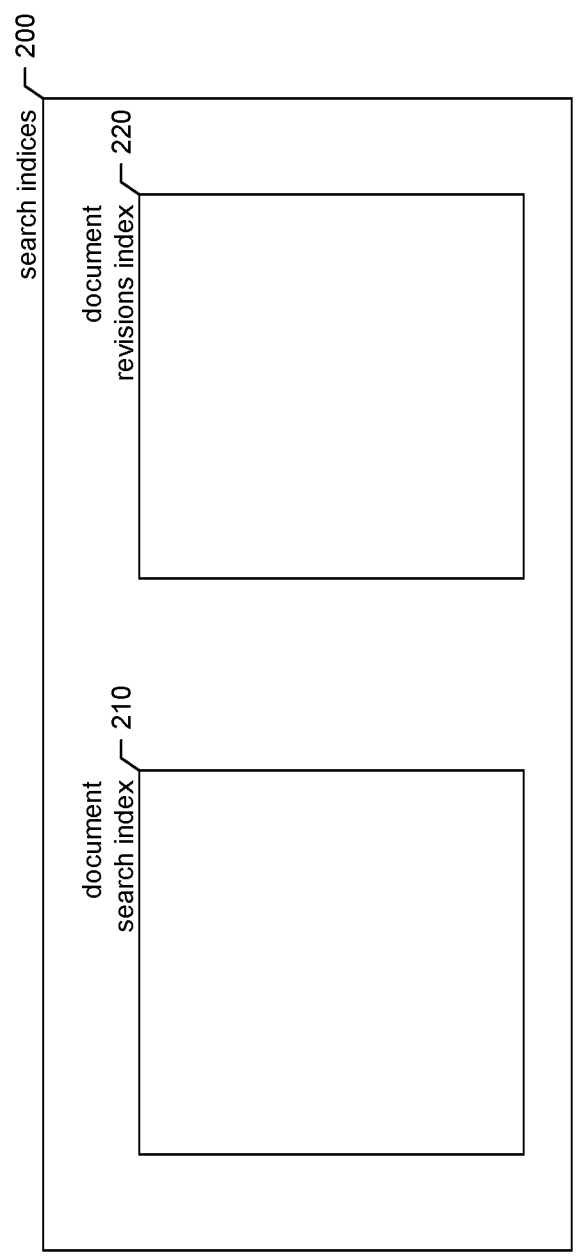
FIG. 2 is a block diagram showing indices used by the facility in some embodiments to service search queries.

FIG. 2 is a block diagram showing indices used by the facility in some embodiments to service search queries. These search indices 200 include a document search index 210 and a document revisions index 220. The document search index is used by the facility in order to determine conventional search results for a search query, such as by identifying documents that have the highest frequency or frequency-per-length of terms in the search query, phrases in the search query, the entire search query, etc.; have the terms of the search query in the closest proximity to each other; the documents that inverse document frequency metrics indicate are most distinguished from other documents by their use of the terms or phrases in the search query; etc. In various embodiments, the facility uses document search indices of various forms, such as an inverted index; a citation index; an n-gram index; a suffix tree; or a document-term matrix, for example. The document revisions index, also called the "edit event index" herein, is used by the facility to identify for each search query document revisions that were performed recently and are relevant to the search query. They may be relevant to the search query, for example, in that they involve adding or inserting some or all of the terms in the search query; changing the spelling or punctuation of some or all of the words in the search query; relocating some or all of the words in the search query; making changes at points near in the document to some or all of the words in the search query; etc. An example of a document revisions index used by the facility in some embodiments is shown in FIGS. 4 and 5, described below.

Figure 3:
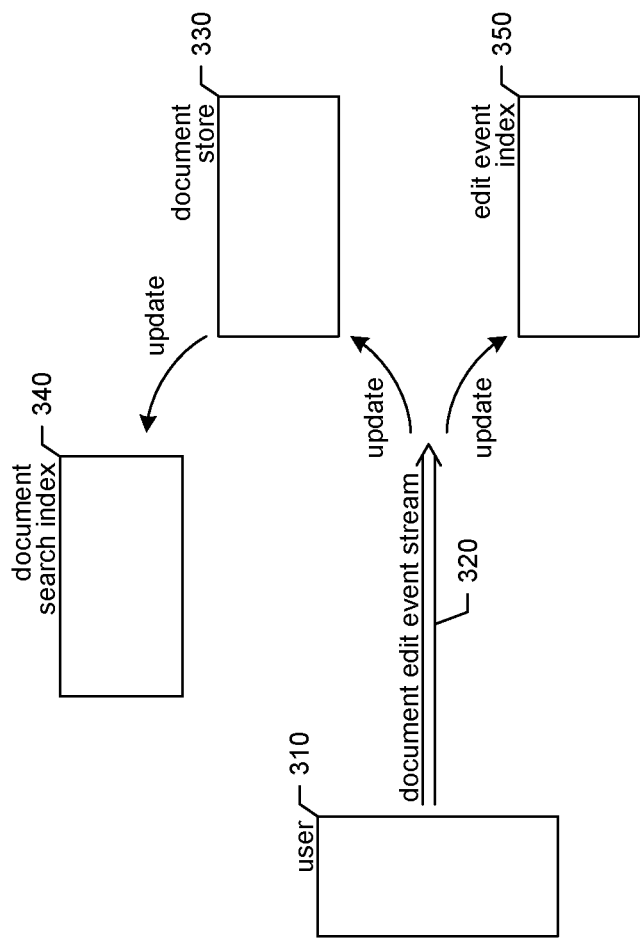
FIG. 3 is a data flow diagram showing a data flow in which the facility maintains its search indices in some embodiments.

FIG. 3 is a data flow diagram showing a data flow in which the facility maintains its search indices in some embodiments. In the data flow, one or more users 310 generates a stream 320 of document edit events. In various embodiments, these events can be at various levels of granularity, such as a per-character level; a per-word level; a per-sentence level; a per-paragraph level; a per-section level; a per-edit session level; etc. The events in the events stream can correspond to various different kinds of editing actions such as deleting text; inserting text; altering text; moving text; changing the formatting of text; etc. The facility uses the edit events in the document edit events stream to update an edit event index 350 (also called a "document revisions index") to reflect information such as the textual terms to which the event related; the identity of the document that was edited; and the time of the edit. The facility also uses edit events in the document edit events stream to update a document store 330, effectively changing the contents of the documents to be consistent with each edit event. The facility further uses the revised contents of the document store to update a conventional document search index 340, such as by periodically crawling the document store. In some embodiments (not shown), some or all of the data and components shown in FIG. 3 are implemented as part of a document graph architecture for representing documents and their contents.

Figure 4:
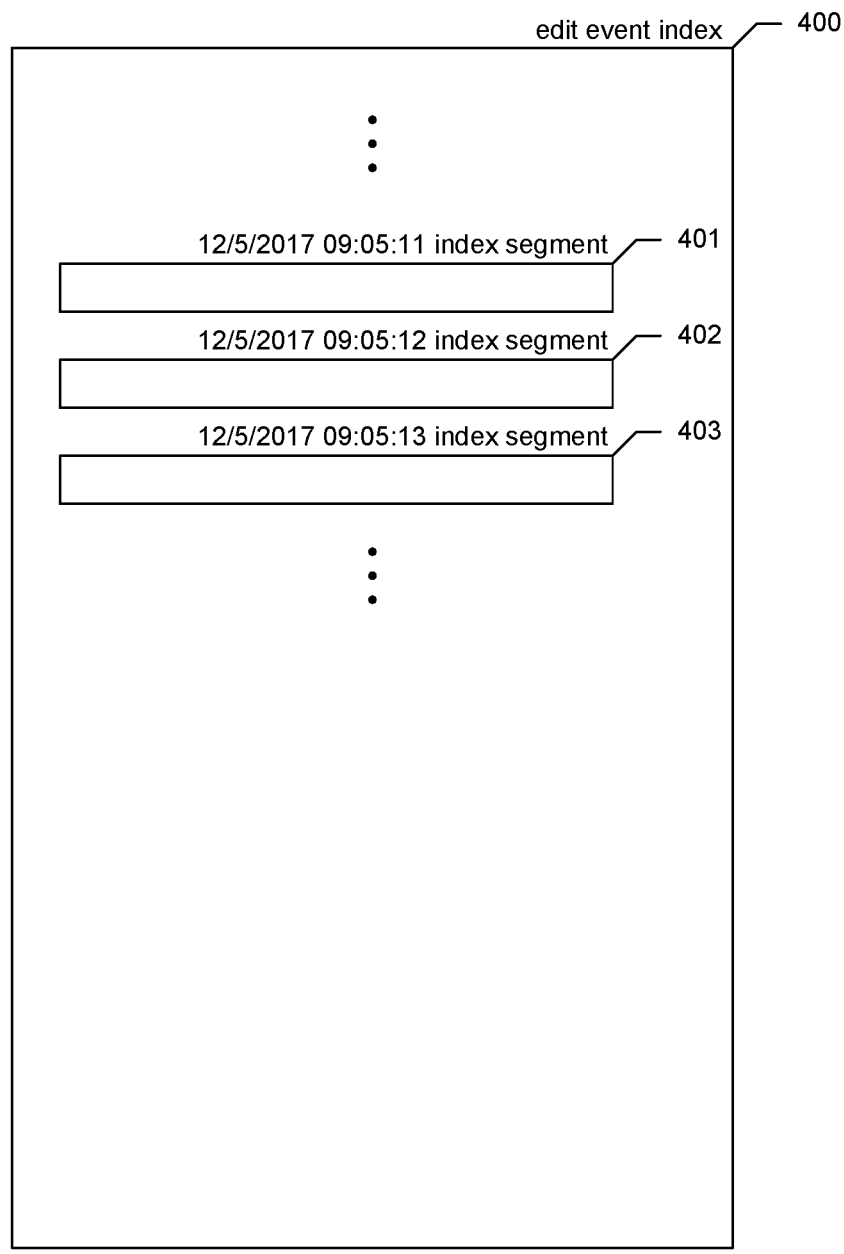
FIG. 4 is a block diagram showing sample contents of an edit event index implemented using time segmentation.

FIG. 4 is a block diagram showing sample contents of an edit event index implemented using time segmentation. The edit event index 400 is made up of index segments, such as index segments 401-403. Each index segment represents edit events that occurred during a different time period. For example, index segments 401-403 each represent edit events that occurred during a different minute of time: index segment 401 represents edit events that were performed between 09:05:11 and 09:05:12 on Dec. 5, 2017; index segment 402 represents edit events that were performed between 09:05:12 and 09:05:13 on the same date; and index segment 403 represents the edit events that were performed between 09:05:13 and 09:05:14 on the same date. In various embodiments, the facility constructs index segments representing edit events that are performed in periods of time of different length, such as 0.1 seconds, one second, ten seconds, one minute, five minutes, ten minutes, 15 minutes, one hour, one day, etc. In some embodiments, as described above, the facility traverses the index segments from latest toward earliest, terminating this traversal after an adequate number of revisions relevant to the search grade have been found.

Figure 5:
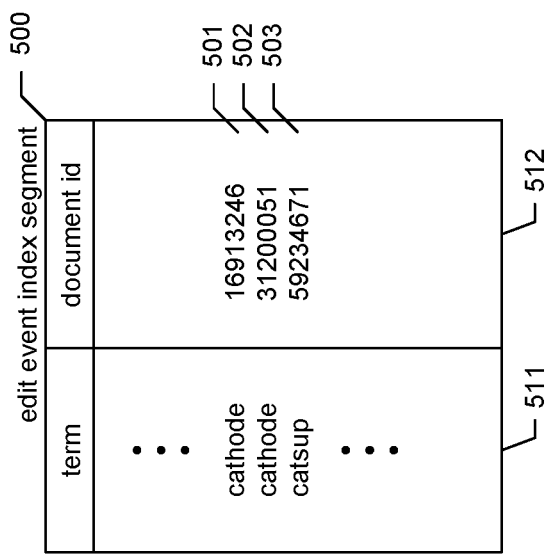
FIG. 5 is a table diagram showing sample contents of an edit event index segment.

FIG. 5 is a table diagram showing sample contents of an edit event index segment. The edit event index segment 500 is made up of rows, such as rows 501-503, each divided into the following columns: a term column 511 containing a term to which an edit event relates; and a document id column 512 containing information identifying the document in which the corresponding edit was performed. For example, row 501 indicates that, during a period of time represented by the edit event index segment, an edit event was performed that relates to the term "cathode" in the document identified by document id 16913246. In various embodiments, each row of the edit event index segment includes various other information (not shown), such as the time of the edit event; the person performing the edit event; the substantive details of the edit event; the location of the edit event within the document; etc. In some embodiments, the facility includes in the edit event index segment information usable to access some or all of this information in sources of information external to the edit event index segment.

While FIG. 5 and each of the table diagrams discussed below show a table whose contents and organization are designed to make them more comprehensible by a human reader, those skilled in the art will appreciate that actual data structures used by the facility to store this information may differ from the table shown, in that they, for example, may be organized in a different manner; may contain more or less information than shown; may be compressed and/or encrypted; may contain a much larger number of rows than shown, etc.

Figure 6:
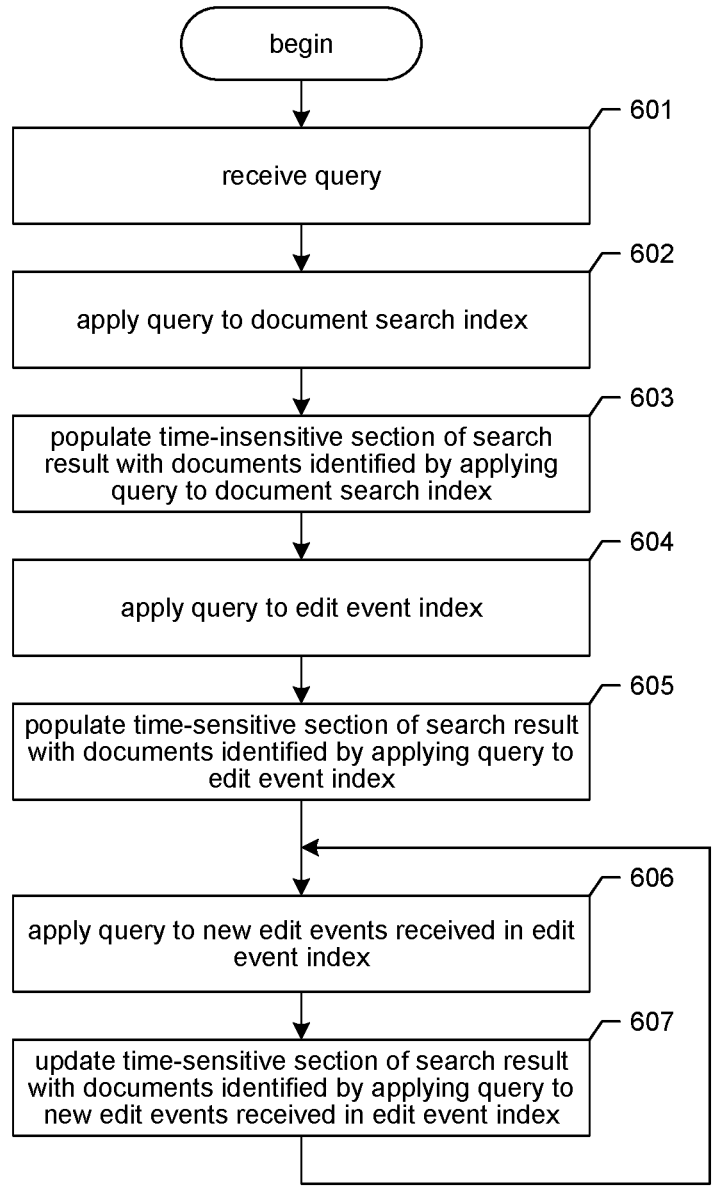
FIG. 6 is a flow diagram showing a process performed by the facility in some embodiments to process a search query.

FIG. 6 is a flow diagram showing a process performed by the facility in some embodiments to process a search query. In act 601, the facility receives a search query, in some embodiments as a text string. In act 602, the facility applies the search query to a conventional document search index in order to identify documents in the corpus that are relevant to the query. In act 603, the facility populates a time-insensitive section of a search result presented to the user submitting the query with some or all of the documents identified in act 602. In act 604, the facility applies the query to the edit event index to identify recent edit events that are relevant to the query. In act 605, the facility populates a time-sensitive section of the search result with information about added events identified in steps 604 and the documents in which they were performed. In act 606, the facility applies the query to new edit events, such as when they are received at the edit event index, when they are present in the document edit event stream, etc. In act 607, the facility updates the time-sensitive section of the search result with edit events identified in act 606 and the documents in which they were performed. After act 607, the facility continues in act 606.

Those skilled in the art will appreciate that the acts shown in FIG. 6 and in each of the flow diagrams discussed below may be altered in a variety of ways. For example, the order of the acts may be rearranged; some acts may be performed in parallel; shown acts may be omitted, or other acts may be included; a shown act may be divided into subacts, or multiple shown acts may be combined into a single act, etc.

Figure 7:
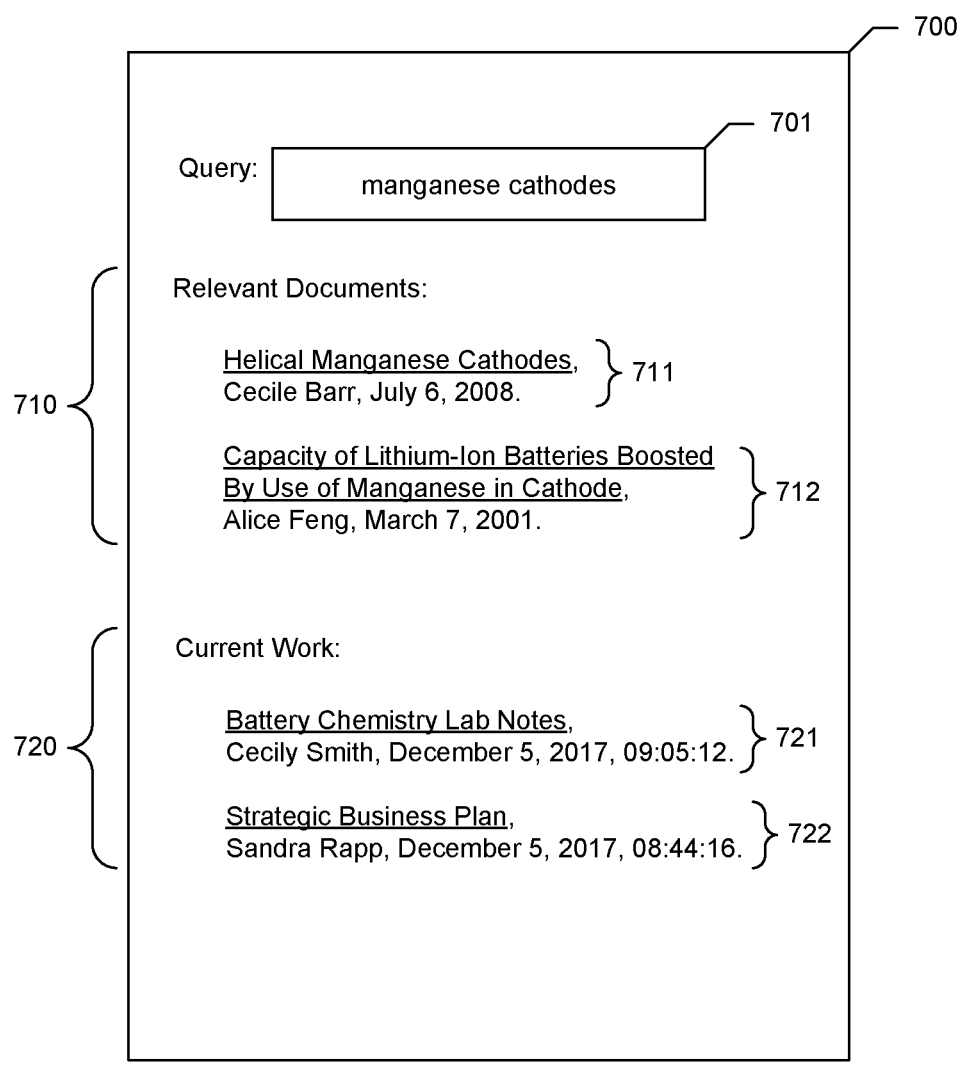
FIG. 7 is a display diagram showing a sample search result presented by the facility in some embodiments.

FIG. 7 is a display diagram showing a sample search result presented by the facility in some embodiments. The search result 700 shows the search query 701 submitted by the user, here "manganese cathodes". The search result further includes a time-insensitive section 710 containing information about documents that are relevant as a whole to the search query. This includes information 711 about a first document and information 712 about a second document. The search result also includes a time-sensitive section 720, including information about recent revisions relevant to the search query and the documents in which they were performed; this includes information 721 about a revision to a third document, and information 722 about a revision to a fourth document.

Figure 8:
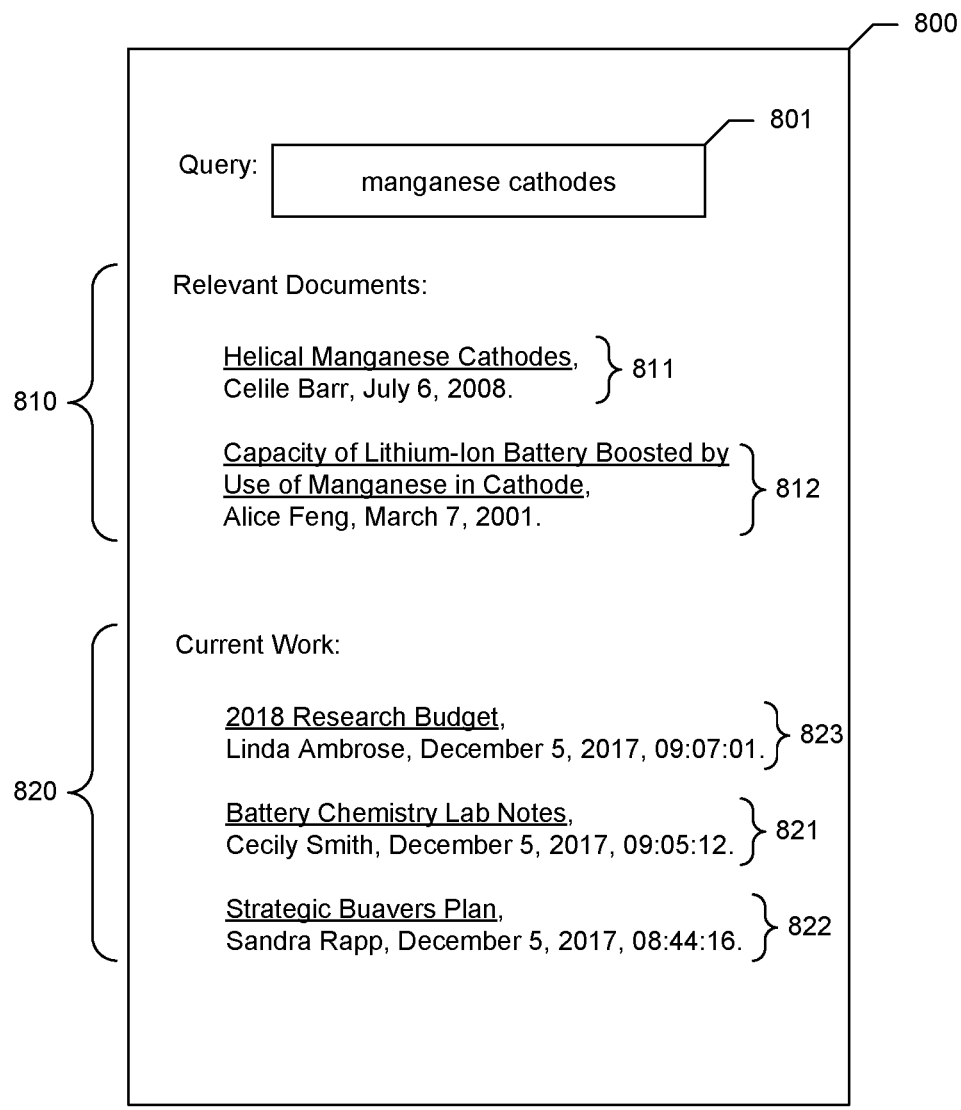
FIG. 8 is a display diagram showing a sample display presented by the facility in some embodiments when an additional revision relevant to the search query is performed after the search result is initially presented.

FIG. 8 is a display diagram showing a sample display presented by the facility in some embodiments when an additional revision relevant to the search query is performed after the search result is initially presented. By comparing display 800 shown in FIG. 8 to display 700 shown in FIG. 7, it can be seen that information 823 has been added to the time-sensitive section 820, and relates to a more-recent relevant revision to a fifth document. In some embodiments (not shown), before adding information 823 to the search result, the facility displays a visual indication that information about additional revisions is available—such as an icon, which the user can interact with in order to cause the facility to display this additional information—such as by selecting the visual indication.

In some embodiments, the facility provides a method in a computing system for reporting on a corpus of documents, comprising: receiving a user-specified search query; in response to the receiving, (a) among documents in the corpus, identifying a proper subset that have each (1) been modified in a manner relevant to the search query (2) at a recent time; and (b) for each of at least a portion of the identified documents, causing to be presented information describing the document.

In some embodiments, the facility provides one or more instances of computer-readable media collectively having contents configured to cause a computing system to perform a method for reporting on a corpus of documents, the method comprising: receiving a user-specified search query; in response to the receiving, (a) among documents in the corpus, identifying a proper subset that have each (1) been edited in a manner relevant to the search query (2) at a recent time; and (b) for each of at least a portion of the identified documents, causing to be presented information describing the document.

In some embodiments, the facility provides a computing system, comprising: a processor; and a memory, the memory having contents that, when executed by the processor, cause the computing system to perform a method for reporting on a corpus of documents, the method comprising: receiving a user-specified search query; in response to the receiving, (a) among documents in the corpus, identifying a proper subset that have each (1) been edited in a manner relevant to the search query (2) at a recent time; and (b) for each of at least a portion of the identified documents, causing to be presented information describing the document.

In some embodiments, the facility provides one or more instances of computer-readable media collectively storing an index data structure reflecting revisions each to a document among a corpus of documents, comprising: information that, for each of a plurality of terms, identifies edits each to a document among the corpus that involve the term, such that, for a search query comprising one or more terms, the information is usable to identify edits to documents among the corpus that are relevant to the search query.

It will be appreciated by those skilled in the art that the above-described facility may be straightforwardly adapted or extended in various ways. While the foregoing description makes reference to particular embodiments, the scope of the invention is defined solely by the claims that follow and the elements recited therein.

We claim:

1. A method in a computing system for reporting on a corpus of documents, comprising:
    maintaining a time-segmented index on modifications to documents of the corpus in which each of a plurality of index segments represents modifications that occurred during a distinct time period;
    receiving a user-specified search query, the search query including at least one term;
    in response to the receiving, identifying, among the corpus of documents, a first subset of the corpus of documents with content relevant to the search query and identifying, among the corpus of documents, a second subset of the corpus of documents, wherein each document included in the second subset has been modified in a manner relevant to the search query, wherein modified in a manner relevant to the search query includes a modification of content included in a document of at least one selected from a group consisting of adding the at least one term to the content, modifying the at least one term included in the content, and relocating the at least one term included in the content, and wherein the identification is performed by traversing the index segments from latest to earliest time period;
    for each document include in the second subset of the corpus of documents, determining time information for the document based on the at least one term included in the search query, the time information including at least one selected from a group consisting of a time when content included in the document was modified to include the at least one term, and a time content included in the document was modified to relocate the at least one term within the content; and
    providing a result to the search query, the result including a first section including selectable links for accessing one or more documents included in the first subset of the corpus of documents and a second section including selectable links for accessing one or more documents included in the second subset of the corpus of documents, wherein each of the selectable links included in the second section is displayed with the determined time information for the associated document included in the second subset of the corpus of documents.

2. The method of claim 1, wherein the identification is performed using the index in the form maintained at a time proximate to a time at which the search query is received.

3. The method of claim 2 wherein the index reflects, for each indexed modification, a time at which the modification was performed, and wherein the identification is sensitive to the revision performance times reflected for the indexed modification.

4. The method of claim 1, further comprising: terminating the traversal of index segments when at least a threshold number of documents have been identified.

5. The method of claim 1, further comprising:
    at a time when the identified documents are being presented, determining that a modification to a distinguished document that is relevant to the search query occurred after presentation of the identified documents began; and
    in response to the determining, causing information describing the distinguished document to be added to the presented information.

6. The method of claim 1, further comprising:
    at a time when the identified documents are being presented, determining that a modification to a distinguished document that is relevant to the search query occurred after presentation of the identified documents began; and
    in response to the determining, causing to be presented, together with the presented information identifying the selected documents, an indication that one or more additional relevant modifications to documents of the corpus have been performed;
    receiving information reflecting interaction with the presented indication; and
    in response to receiving the information reflecting interaction, causing information describing the distinguished document to be added to the presented information.

7. The method of claim 1 wherein the search query is received from a distinguished user, the method further comprising:
    at a time after presentation of the identified documents is concluded, determining that a modification to a distinguished document that is relevant to the search query occurred after presentation of the identified documents began; and
    in response to the determining, generating a notification to the distinguished user information describing the distinguished document to be added to the presented information.

8. Computer memory storing an index data structure reflecting revisions each to a document among a corpus of documents, comprising:
    information that provides a time-segmented index on modifications to documents of the corpus in which each of a plurality of index segments represents modifications that occurred during a distinct time period, and for each of a plurality of terms, identifies edits each to a document among the corpus that involve the term, such that, for a search query comprising one or more terms, the information is usable to identify edits to documents among the corpus that are relevant to the search query by traversing the index segments from latest to earliest time period, wherein edits relevant to the search query include a modification of content included in a document among the corpus of at least one selected from a group consisting of adding the one or more terms to the content, and modifying the one or more terms included in the content, relocating the one or more terms included in the content, wherein the information further indicates, for each identified edit, a time at which the identified edit was performed, such that, for the search query comprising one or more terms, the information is usable to identify edits to documents among the corpus that are relevant to the search query and to display time information for documents among the corpus identified as having edits relevant to the search query as part of providing a result to the search query, the time information including at least one selected from a group consisting of a time when content included in the document was modified to include the at least one term, and a time content included in the document was modified to relocate the at least one term within the content.

9. Computer memory having contents configured to cause a computing system to perform a method for reporting on a corpus of documents, the method comprising:
   maintaining a time-segmented index on modifications to documents of the corpus in which each of a plurality of index segments represents modifications that occurred during a distinct time period;
   receiving a user-specified search query, the search query including at least one term;
   in response to the receiving, identifying, among the corpus of documents, a first subset of the corpus of documents with content relevant to the search query and identifying, among the corpus of documents, a second subset of the corpus of documents, wherein each document included in the second subset has been edited in a manner relevant to the search query, wherein edited in a manner relevant to the search query includes a modification of content included in a document of at least one selected from a group consisting of adding the at least one term to the content, modifying the at least one term included in the content, and relocating the at least one term included in the content, and wherein the identification is performed by traversing the index segments from latest to earliest time period;
   for each document included in the second subset of the corpus of documents, determining time information for the document based on the at least one term included in the search query, the time information including at least one selected from a group consisting of a time when content included in the document was modified to include the at least one term, and a time content included in the document was modified to relocate the at least one term within the content; and
   providing a result to the search query, the result including a first section including selectable links for accessing one or more documents included in the first subset of the corpus of documents and a second section including selectable links for accessing one or more documents included in the second subset of the corpus of documents, wherein each of the selectable links included in the second section is displayed with the determined time information for the associated document included in the second subset of the corpus of documents.

10. The computer memory of computer-readable media of claim 9 wherein the identified documents were each edited in a manner relevant to the search query by a person who, in a social graph or an organizational graph, at a maximum distance from a person who specified the search query or nearer.

11. The computer memory of claim 9 wherein the time-segmented index reflects, for each indexed edit, a time at which the edit was performed, and wherein the identification is sensitive to the revision performance times reflected for the indexed edits.

12. The computer memory of claim 9, the method further comprising:
   at a time when the identified documents are being presented, determining that an edit to a distinguished document that is relevant to the search query occurred after presentation of the identified documents began; and
   in response to the determining, causing information describing the distinguished document to be added to the presented information.

13. The computer memory of claim 9, the method further comprising:
   at a time when the identified documents are being presented, determining that an edit to a distinguished document that is relevant to the search query occurred after presentation of the identified documents began; and
   in response to the determining, causing to be presented, together with the presented information identifying the selected documents, an indication that one or more additional relevant edits to documents of the corpus have been performed;
   receiving information reflecting interaction with the presented indication; and
   in response to receiving the information reflecting interaction, causing information describing the distinguished document to be added to the presented information.

* * * * *